United States Patent
Scipione et al.

(10) Patent No.: US 11,545,929 B2
(45) Date of Patent: Jan. 3, 2023

(54) SOLAR PANEL RACKING SYSTEM

(71) Applicants: Donald S. Scipione, Cleveland Heights, OH (US); Rob Martens, Cleveland, OH (US)

(72) Inventors: Donald S. Scipione, Cleveland Heights, OH (US); Rob Martens, Cleveland, OH (US)

(73) Assignee: UNITED STATES DEPARTMENT OF ENERGY, Washington, DC (US)

( * ) Notice: Subject to any disclaimer, the term of this patent is extended or adjusted under 35 U.S.C. 154(b) by 0 days.

(21) Appl. No.: 17/233,388

(22) Filed: Apr. 16, 2021

(65) Prior Publication Data

US 2021/0242827 A1 Aug. 5, 2021

Related U.S. Application Data

(63) Continuation-in-part of application No. 16/910,848, filed on Jun. 24, 2020, now abandoned, which is a continuation-in-part of application No. 16/269,663, filed on Feb. 7, 2019, now abandoned.

(51) Int. Cl.
  *H02S 30/10* (2014.01)
  *H02S 40/34* (2014.01)

(52) U.S. Cl.
  CPC ............. *H02S 30/10* (2014.12); *H02S 40/34* (2014.12)

(58) Field of Classification Search
  CPC .......... H02S 20/10; H02S 20/24; H02S 30/10; H02S 40/34; F24S 2025/02; F24S 25/634; F24J 2/5256; F24J 2/5258; F24J 2/5254
  See application file for complete search history.

(56) References Cited

U.S. PATENT DOCUMENTS

| | | | | |
|---|---|---|---|---|
| 6,370,828 | B1 * | 4/2002 | Genschorek | F24S 25/634 52/173.3 |
| 7,921,843 | B1 * | 4/2011 | Rawlings | H02S 20/24 52/90.2 |
| 9,196,755 | B2 * | 11/2015 | Wildes | F24S 25/636 |
| 9,276,518 | B2 * | 3/2016 | Pantel | H02S 20/10 |
| 2004/0112005 | A1 * | 6/2004 | Fischer | B21D 47/00 52/749.1 |
| 2005/0217716 | A1 * | 10/2005 | Masuda | F24S 25/65 136/244 |

(Continued)

FOREIGN PATENT DOCUMENTS

| | | |
|---|---|---|
| CA | 2980699 | 9/2016 |
| EP | 1376029 | 1/2004 |

(Continued)

*Primary Examiner* — Christine T Cajilig
(74) *Attorney, Agent, or Firm* — Renner, Otto, Boisselle & Sklar, LLP

(57) ABSTRACT

A method of installing on a horizontal or near-horizontal support surface a solar panel array including multiple solar panels may include, at the deployment site, fabricating from metal coil stock longitudinally continuous rack channels each having upstanding legs of different heights, locating the channels in parallel rows with a spacing determined by a width of the solar panels with interior spaces of the channels facing upwardly, weighing the channels down on the support surface by placing ballast in the channel spaces, and positioning the solar panels each with an edge supported by a high leg of one channel of the channels and an opposite edge supported by a low leg of an adjacent channel of the channels.

16 Claims, 7 Drawing Sheets

(56) References Cited

U.S. PATENT DOCUMENTS

| | | | |
|---|---|---|---|
| 2008/0053517 A1* | 3/2008 | Plaisted | F24S 25/20 |
| | | | 136/251 |
| 2009/0107078 A1* | 4/2009 | Berridge | E04B 1/24 |
| | | | 52/745.19 |
| 2010/0236183 A1 | 9/2010 | Cusson et al. | |
| 2010/0242243 A1 | 9/2010 | Kroskey et al. | |
| 2011/0154774 A1* | 6/2011 | Rawlings | F24S 25/15 |
| | | | 52/745.21 |
| 2012/0211252 A1* | 8/2012 | Turziano | F24S 25/61 |
| | | | 174/6 |
| 2013/0003274 A1* | 1/2013 | Turziano | F24S 25/15 |
| | | | 361/679.01 |
| 2013/0276867 A1* | 10/2013 | Wildes | H01L 31/048 |
| | | | 136/246 |
| 2015/0171786 A1* | 6/2015 | Worden | F24S 25/636 |
| | | | 136/251 |
| 2016/0261228 A1 | 9/2016 | Kanbara et al. | |
| 2017/0111006 A1* | 4/2017 | Vietas | H02S 20/24 |
| 2017/0138048 A1 | 5/2017 | Leonard | |
| 2019/0222169 A1* | 7/2019 | Yang | H02S 20/23 |
| 2019/0301180 A1 | 10/2019 | Dutil et al. | |
| 2019/0334472 A1* | 10/2019 | MacDonald | F24S 25/70 |
| 2020/0266755 A1* | 8/2020 | Dick | H02S 20/23 |

FOREIGN PATENT DOCUMENTS

| | | | | |
|---|---|---|---|---|
| EP | 1376029 A2 * | 1/2004 | | F24J 2/5235 |
| EP | 2522929 B1 * | 12/2014 | | F24J 2/5233 |
| WO | 2016152680 | 9/2016 | | |
| WO | WO-2016152680 A1 * | 9/2016 | | H02S 20/23 |

* cited by examiner

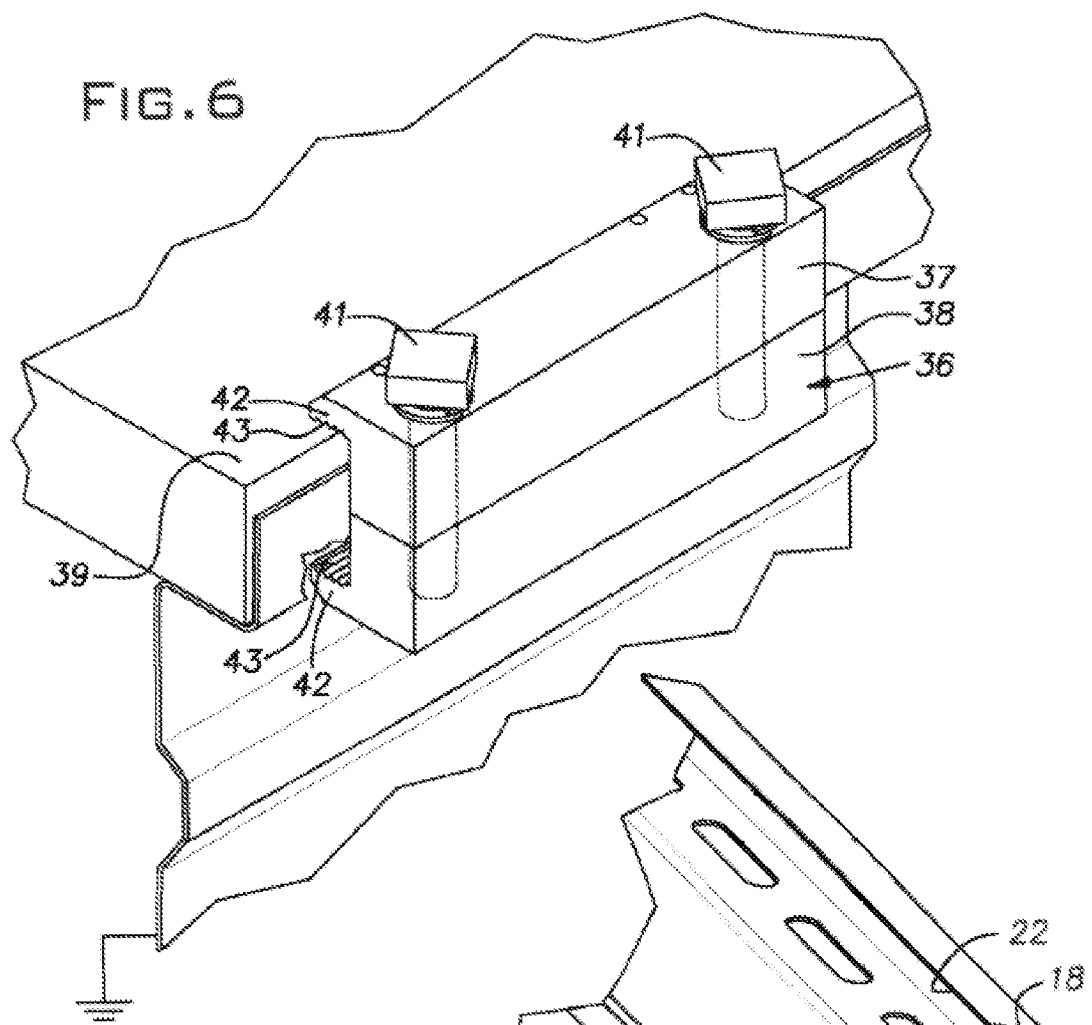
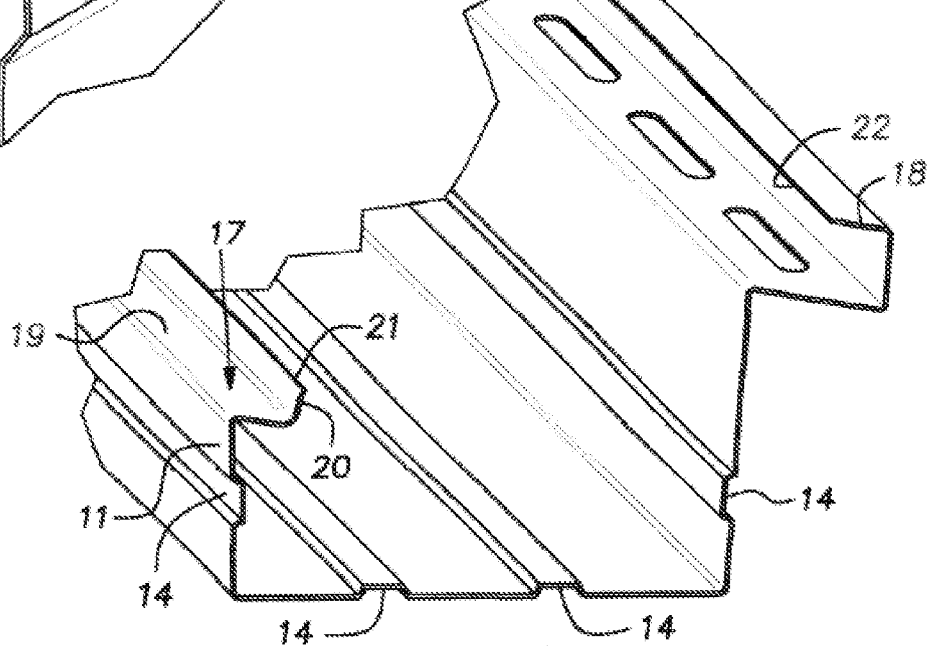

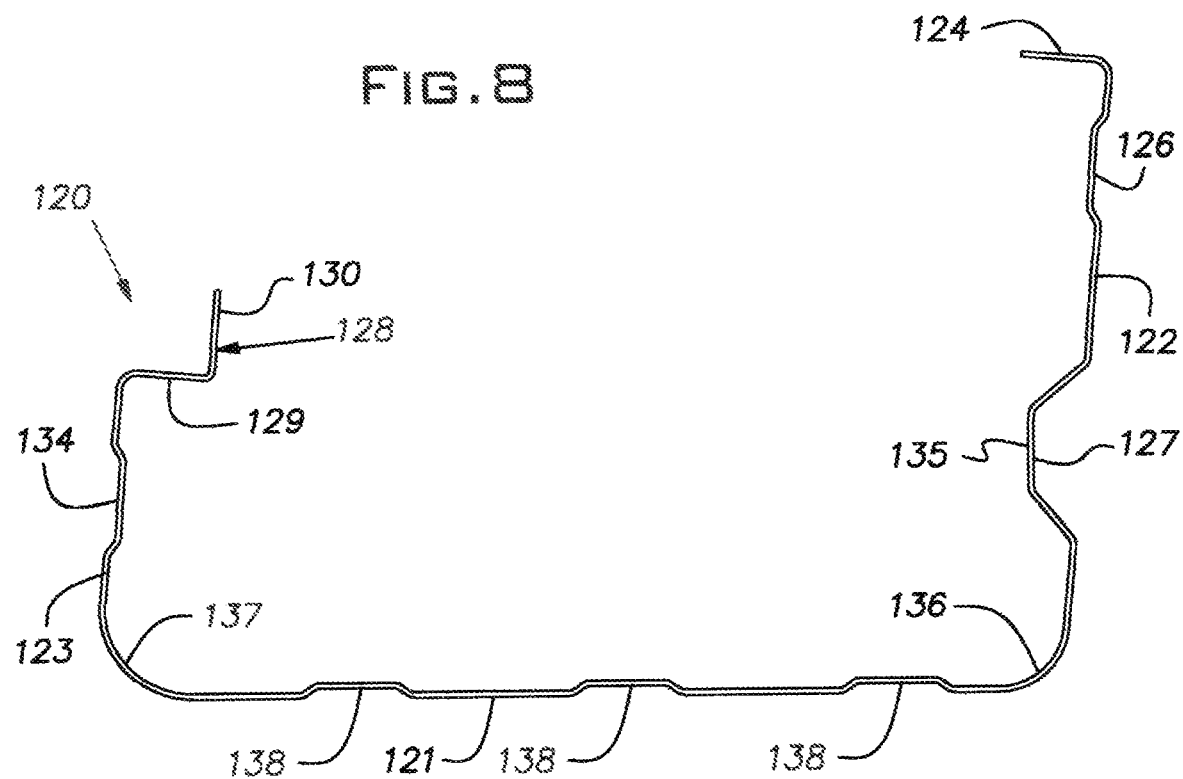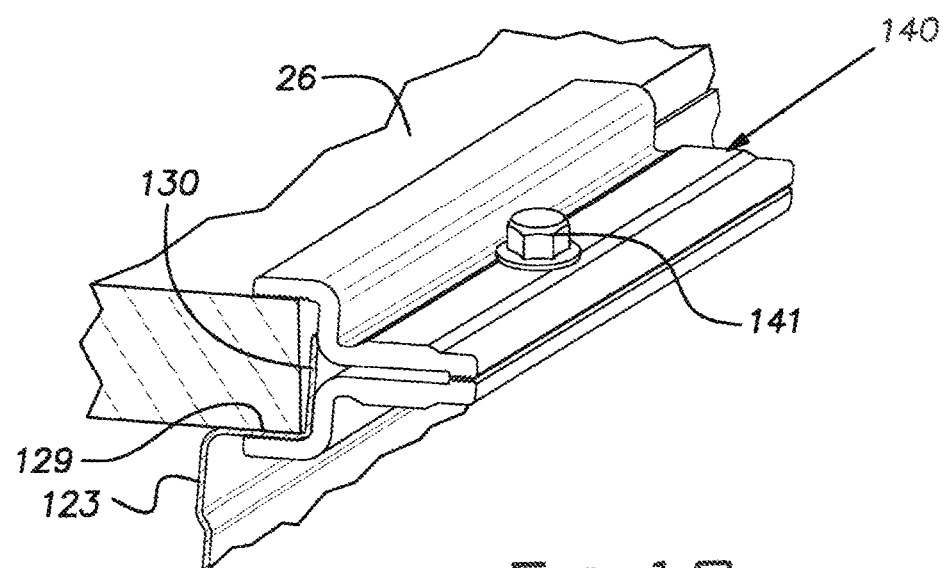

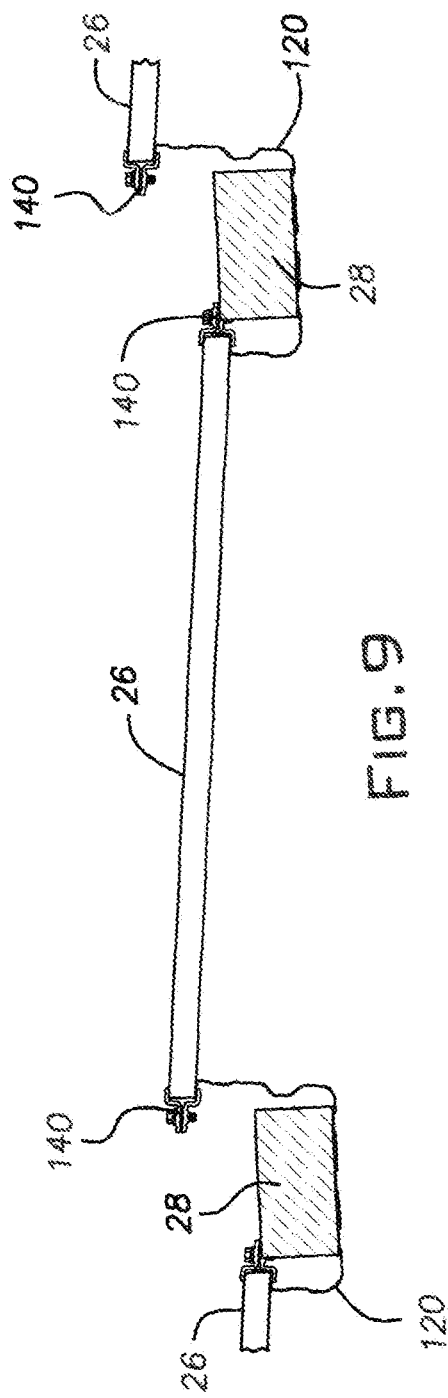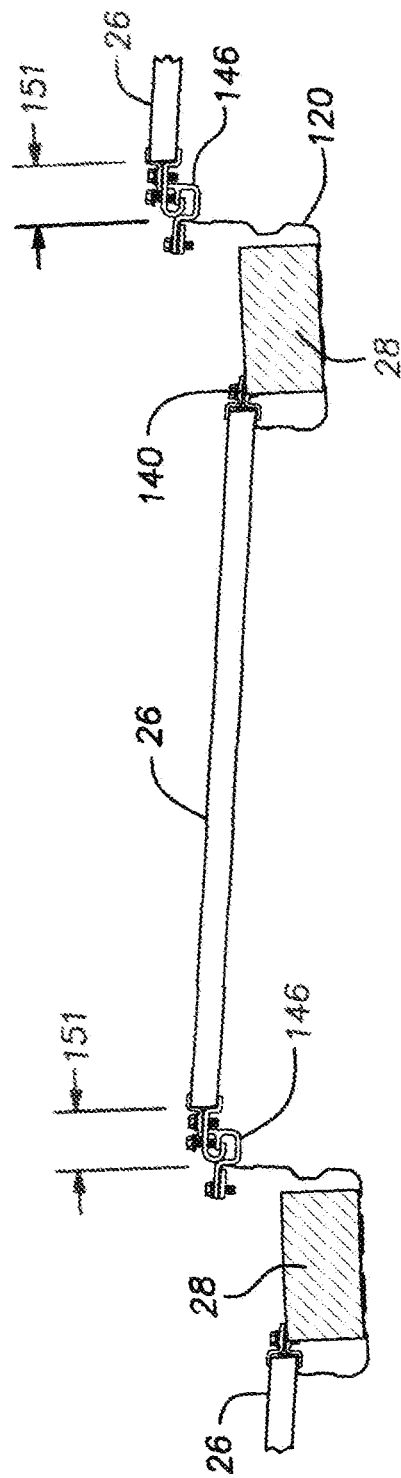

SOLAR PANEL RACKING SYSTEM

CROSS-REFERENCE TO RELATED APPLICATIONS

This is a continuation-in-part of U.S. Ser. No. 16/910,848, filed Jun. 24, 2020, which is a continuation-in-part of U.S. Ser. No. 16/269,663, filed Feb. 7, 2019, the entire disclosures of which are hereby incorporated by reference.

BACKGROUND OF THE INVENTION

The present disclosure relates to solar panel support systems particularly useful on flat or nearly flat roof and ground level fields.

Conventional arrangements for supporting solar panels at a desired angle or orientation involved multiple parts including extrusions, bracketry, mounting tabs, and numerous fasteners requiring manual on-site assembly. Besides assembly, costs associated with these multiple component systems can include their separate purchase, handling, inventorying, shipping, and allowances for loss, particularly of small parts. Required on-site manual assembly of prior systems adds the risk of component damage and improper installation through human error, carelessness, inattention, or the like.

Before delivery to a site, prior systems can require extensive measurement of the intended site, determination of obstacles which lie in the field of the solar panel array, and communication of the same to the source of the system to define requirements and place a parts order, for example. Unintended delays in shipping from a manufacturer to a site, and the risk of damage of system components when in transit or even the complete loss of a system or of separate parts of divided shipments add to overall costs.

Another significant disadvantage of conventional solar panel support systems were size limitations imposed by delivery methods of the multiple parts described above.

SUMMARY OF THE INVENTION

The present disclosure provides a one-piece channel-based rack system. The rack channel may be roll-formed of sheet metal, using machinery located and operated at the installation site at the time of installation. On-site, on-demand production of the rack channel may afford numerous cost-saving advantages over prior techniques. For example, inventory may be largely eliminated, multiple handling steps of components may be avoided, and end-to-end assembly of components and associated fastening elements may be eliminated. On-site, on-demand production of the rack channel may also allow for sizes (e.g., lengths) of rack channels previously unavailable on account of transportation of off-site built channels to installation sites.

The continuous structure of the disclosed rack channel may also be beneficial from a safety standpoint where, as disclosed herein, the rack channel may be used as a redundant electrical ground circuit for a series of photovoltaic solar panels assembled on the rack channel so as to provide a complete grounded framework for the entire solar array.

The illustrated rack channel, after being located on a bearing surface, may be weighted down with suitable ballast blocks of concrete or the like set into the channel interior. Preferably, walls of the channel are formed with ribs, extending into the interior, that serve to stiffen the channel, provide air circulation, protect the walls from impacts, abrasion, and stress risers associated with the ballast blocks, and improve positional stability on the bearing surface. The longitudinally continuous character of the rack channel reduces aerodynamic forces otherwise tending to lift the solar panels supported on the rack channels. Among other benefits, this longitudinal continuity and resulting aerodynamic force reduction can enable less ballast to be used to anchor a system down.

It is estimated that the disclosed solar panel rack system can reduce installation costs of solar arrays by 30% and overall costs by about 9%.

BRIEF DESCRIPTION OF THE DRAWINGS

FIG. 6 is a schematic fragmentary perspective view of a typical clamp used to secure a solar panel to an upstanding leg of a rack channel and to electrically ground the longitudinal border of the solar panel to the rack channel.

FIG. 7 is a schematic fragmentary perspective view of an alternative rack channel.

FIG. 8 is a cross-sectional view of a second, alternative rack channel.

FIG. 9 is an end elevational view of an installation utilizing rack channels of the style shown in FIG. 8.

FIG. 10 is a perspective view of a plain style clamp for securing a panel edge to a rack channel.

FIG. 11 is an end elevational view of an installation assembled with a gap forming, hinge style clamp.

DESCRIPTION OF THE PREFERRED EMBODIMENTS

Figure 1:
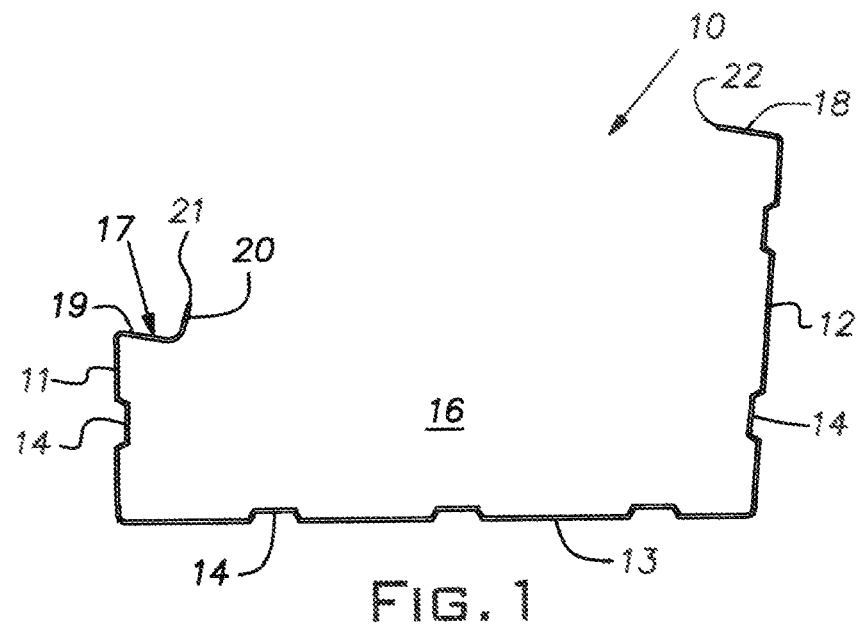
FIG. 1 is an end view of a rack channel embodying the present invention.

An elongated, longitudinally continuous rack channel 10 is shown in various figures. The rack channel 10, sometimes referred to simply as the channel 10, may be formed from a continuous strip of flat sheet metal stock. For example, the channel 10 may be fabricated of a strip stock such as 22 or 24 gauge steel coated with an alloy of 45% zinc and 55% aluminum marketed under the trademark GALVALUME®. Other metal stock such as galvanized steel or anodized aluminum of various gauges can be used. FIG. 1 illustrates the rack channel 10 in end view, the cross-section of the rack channel may have the same geometry, constant along the full length of the rack channel.

The channel 10 may have a generally rectangular cross-section with two generally upstanding legs or walls 11, 12 and a generally horizontal base or wall 13. The legs 11, 12 may be of unequal heights, a short leg 11 measuring approximately 3 inches in height and a longer leg 12 measuring approximately 6½ inches in height. The shorter leg 11 may be generally vertical and the taller leg 12 tilted slightly outward so that an angle between planes of this leg and the base is greater than 90 degrees. Preferably, the legs 11, 12 and base 13 each lie in respective flat planes except for shallow, trapezoidal ribs 14 formed in the sheet stock to project inwardly towards a center or interior 16 of the rack channel. The ribs 14 project for example about ⅛ inch into the channel interior. Flanges 17, 18 integral with the legs 11, 12 extend continuously along the full length of a rack channel 10. A lower one of the flanges 17 integral with the short leg 11 has a slightly declining portion 19 of 1 1/16 inch width, for example, and an upstanding stop portion 20 with a free edge 21. The upper flange 18, integral with the taller leg 12, lies in a plane that is preferably perpendicular to the plane of the taller leg and terminates in a free edge 22.

As a result of the rack channel 10 being formed of a single sheet or strip of stock, the base 13, legs 11 and 12, ribs 14 and flanges 17, 18 may be all integral with one another and, preferably, are longitudinally continuous from one end of the rack channel 10 to the other end.

Figure 5:
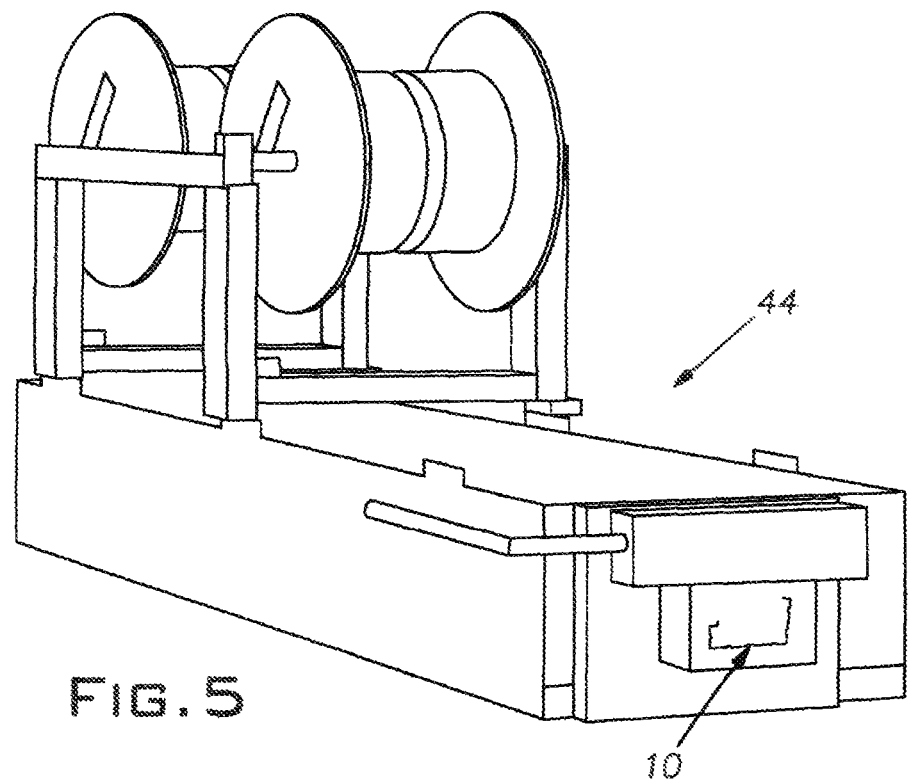
FIG. 5 is a perspective schematic view of a roll-forming machine for on-site, on-demand forming of individual rack channels.

The rack channel 10 may be roll-formed with a portable machine 44 such as depicted in FIG. 5. A rack channel 10 is cut to a desired length as it exits the machine preferably by shear elements of the machine itself. Thus, the rack channel 10 may be manufactured from coil stock at the installation site of a solar array.

The process of making the rack channel 10 on-site at the time of installation of a solar array affords many benefits including avoidance of inventory, design or clerical misordering, shipping of a non-nestable bulky product, double handling and stockpiling if not immediately set in place, and multiple part assembly.

Figure 3:
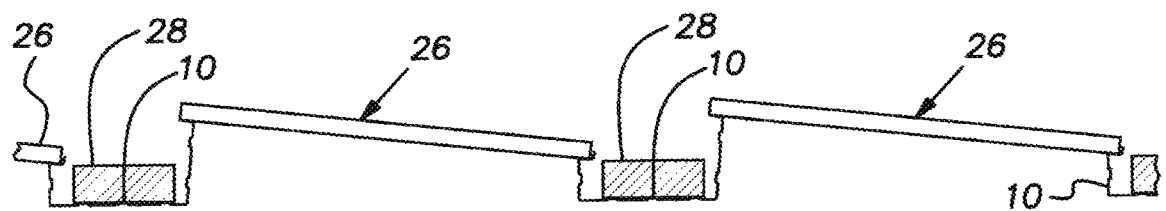
FIG. 3 is a somewhat schematic end view of a plurality of laterally spaced rack channels weighted down by ballast blocks and carrying individual solar panels.
Figure 4:
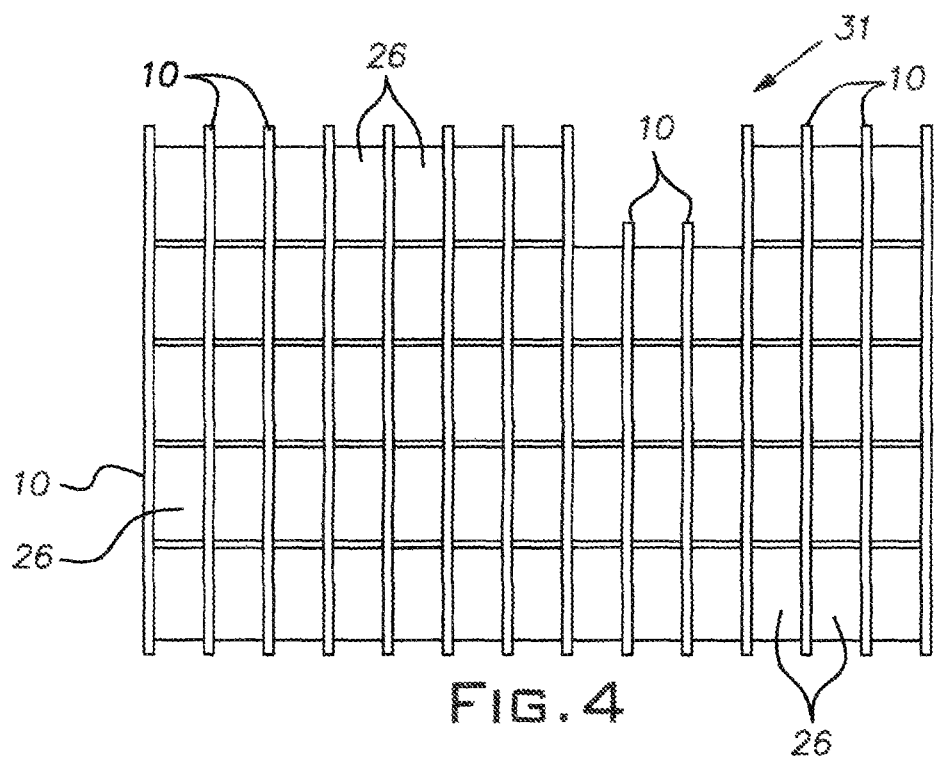
FIG. 4 is a schematic plan view of a rectangular solar panel array.
Figure 4A:
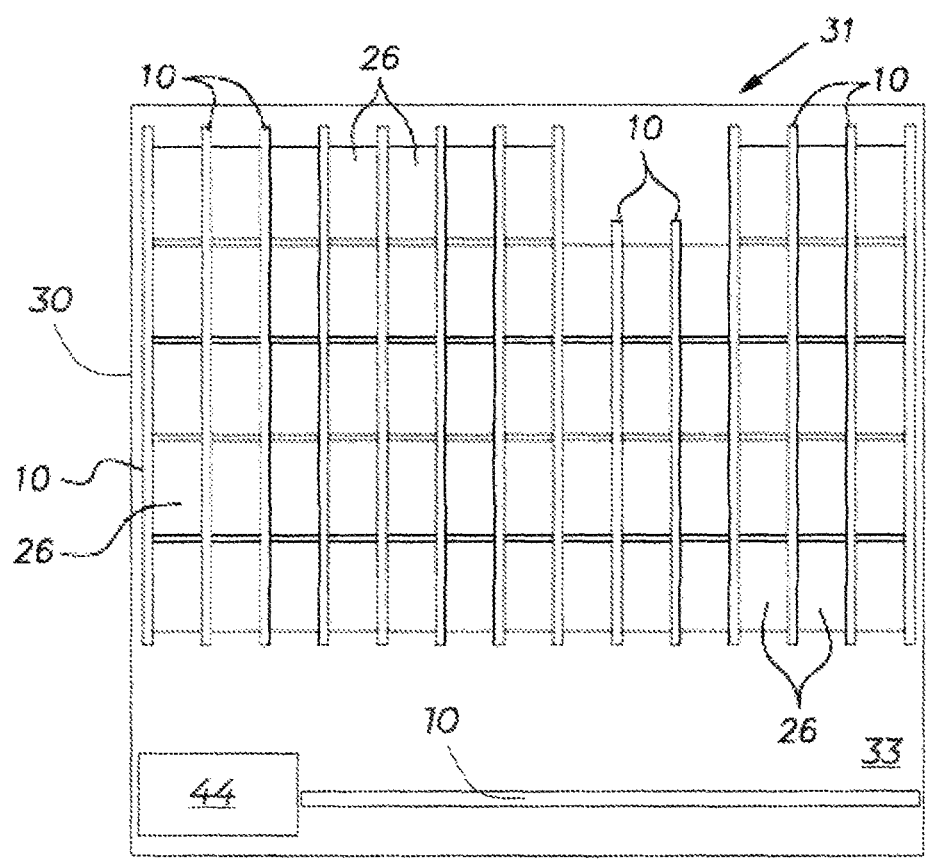
FIG. 4A is a schematic plan view of a rectangular solar panel array on a deployment site.

FIGS. 3, 4, and 4A illustrate an installation of a solar panel array where a plurality of individual solar panels 26 are supported on the rack channels 10. The disclosed rack channels 10 are proportioned to be used on flat or nearly flat surfaces such as a level ground surface or a flat roof of a commercial building. The rack channels 10 may be laterally spaced from one another, in parallel, so that a panel 26 is supported at one edge on the short or low height leg flange 17 of one rack channel 10 and at the opposite edge is supported on the high leg flange 18 of an adjacent rack channel 10. A panel 26 is typically rectangular and can be 3 foot wide and 6½ foot long, for example, with its long edges supported on the flanges 17 of the channel 10 to the left of the solar panel, 18 of the channel to the right of the solar panel.

The rack channels 10 can be weighted down to secure them in position by locating conventional ballast bricks 28 in the channel interior 16. The bricks 28, as needed, are distributed along the full length of each rack channel 10, being placed end-to-end or spaced from one another. Alternatively, river rock, stone, or other dense material can be used as ballast.

The differential height of the legs 11, 12, taking into account the width of a panel 26, is selected so that an installed panel lies in a desired angle from the horizontal, sometimes referred to as the inclination, such that a panel more fully faces the sun. The inclination can be between about 5 and about 10 degrees, for example. Normally, at a given site, all of the panels 26 are supported in the same inclination angle.

Figure 2:
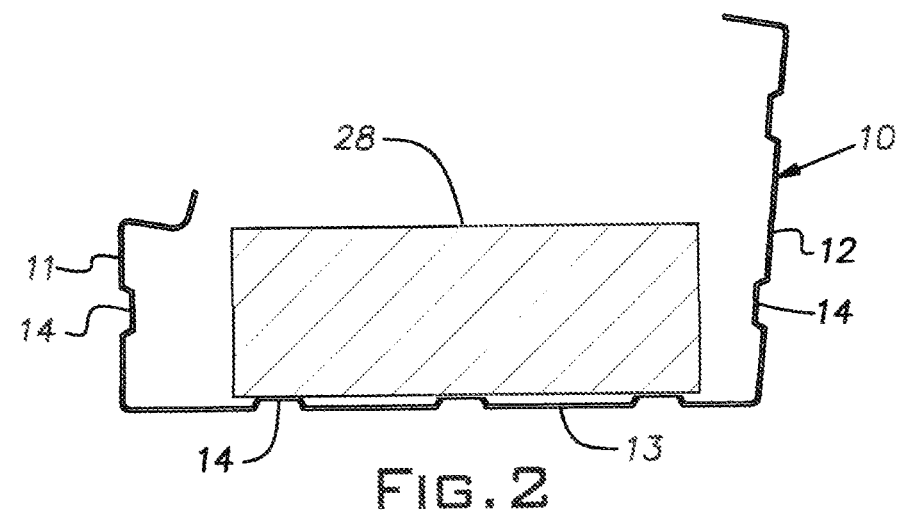
FIG. 2 is a view similar to FIG. 1 illustrating a typical ballast block received in an interior of the rack channel.

As can be understood from FIG. 2, the ribs 14 prevent corners of the ballast brick or block 28 from contacting the walls 11-13. Ribs 14 on the base wall 13 allow air circulation, moisture drainage, and enable the bottom wall 12 to grip the underlying surface or substrate to improve resistance to lateral shifting of a rack channel 10. The ribs 14, additionally, improve the stiffness of a rack channel 10.

Inspection of FIG. 3 reveals that the taller leg 12 is tilted outwardly in a direction making it perpendicular or about perpendicular to the inclination plane of the panel 26 it supports and non-parallel with the shorter leg 11. Preferably, the flanges 17, 18 at the top of the legs 11, 12 lie in respective planes parallel to the inclination plane of the panels 26.

FIG. 4 is a schematic illustration of a plan view of a solar panel array 31 which, as is typical, is rectangular, and includes the disclosed rack channels 10 and solar panels 26. As shown, the rack channels 10 are arranged in parallel rows and extend continuously lengthwise across one of the dimensions (length or width) of the array 31.

Lengths of the rack channels 10 can be shorter than an array span where objects exist such as where an air conditioner or sanitary vents rise above the plane of a roof.

The solar panels 26 can be of the photovoltaic type generating electrical current when energized by sunlight at a voltage of, for example, 20 volts per panel. Typically, the panels 26 are electrically connected in series so that voltages can readily become high enough to be lethal to humans. As a safety measure, the panels 26 are grounded to the rack channels 10. A rack channel 10 along with all of the other rack channels of an array 31, is individually grounded.

In practicing certain aspects of the invention, mentioned above, the channels 10 can be manufactured on-site by roll-forming a coil of sheet metal at the time a solar panel array 31 is being installed.

As illustrated in FIG. 4A, the rack channels 10 being fabricated on site may require a deployment site 30 that, in addition to including the support surface on which the solar panel array 31 will reside, allows for a fabrication area 33 adjacent the support surface large enough to accommodate relatively large rack channels 10 in excess of 21, 40, 53, 90, or even 100 feet or longer. In the illustrated example of FIG. 4A, the deployment site 30 corresponds to an area within which the solar panel array 31 will reside after installation and an adjacent area 33 for channel fabrication. The required fabrication area 33 may be at least equal to the width (e.g., 8 feet) of the roll forming machine 44 times the length (e.g., 12 feet) of the roll forming machine 44 plus the length of the longest channel 10. For example, if the length of the longest rack channel 10 is 100 feet, the length of the production area may be 12 feet (i.e., the length of the machine 44) plus 100 feet, or a total of 112 feet times the 8 feet (i.e., the width of the machine 44).

In one embodiment, the support surface on which the solar panel array 31 resides to a roof of a building and the adjacent area 33 corresponds to a ground area adjacent the building. In such a case, the channels 10 may be fabricated on-site on the ground and lifted to the roof to be installed on the support surface, i.e., the roof. In such a case, the deployment site 30 corresponds to the roof (the support surface) plus the adjacent area 33 on the ground.

In each case, the deployment site 30 necessary for fabrication and installation on-site is relatively small. The area 33 allows a deployment site 30 on which the rack channels 10 may be on-site fabricated. It is thus possible to keep each of the rack channels on the deployment site 30 from fabrication of the rack channel 10 to operation of the solar panel array 31 to produce electricity. This is a first in the industry.

This on-site, on-demand production has numerous advantages over traditional practices. On-site production eliminates a conventional supply chain including shipping, warehousing, and delivery of relatively bulky product. Since lengths of the rack channel 10 are made to fit the array pattern, there is no cut-off waste as there would be with pre-manufactured lengths. End-to-end assembly of pre-manufactured regular lengths would typically require labor, time, separate fasteners, and run the risk of improper or faulty assembly and misalignment. The continuous structure of a rack channel 10 along a full dimension of an array 31, as more fully discussed below, provides a secure grounding circuitry for the panels 26 and avoids the risk of an electrical short between channel segments and a failure of a ground circuit. Each of the panels mounted to a channel 10 may be grounded to the channel 10 and, since the channel 10 is continuous, the channel 10 may have a single connection to earth or to the ground connection of a remote power system.

Typical length limitations of prior art pre-manufactured systems include regular highway truck trailer lengths of 40 feet or 53 feet in the U.S.A., and common steel product lengths of 20 foot and 21 foot for bar and pipe, respectively. The present invention contemplates rack channel lengths significantly beyond these traditional transportation limitations since, inter alia, there is no limitation imposed by transportation. With rack channel joints eliminated, there is no need for related fasteners, splice elements and associated labor.

FIG. 6 illustrates a typical clamp 36 used to fix a solar panel 26 to a rack channel 10. The clamp 36, made of aluminum or other electrically conductive metal or alloy, comprises a set of upper and lower L-shaped body parts or blocks 37, 38 that are assembled in a C-shape. The blocks 37, 38, of a length of 4 inches, for example, are positioned above a longitudinal edge 39 of a panel 26 and below a channel flange 17 or 18. A pair of bolts 41 are assembled through clearance holes in the upper block 37 and threaded into internal threads in the lower block 38. Faces of jaws 42 of the blocks 37, 38 are made with teeth 43 that bite into the panel edge 39 and flange 17 or 18 to assure electrical continuity between the panel edge and rack channel 10 so that a panel is electrically grounded with the channel. Typically, at least two clamps 36 are provided along each solar panel edge 39 on each channel flange 17, 18. Each rack channel 10 is suitably electrically grounded at the site of the solar array 31. Where the panels 26 have their entire peripheries grounded, there is multiple redundancy in grounding of an array 31 because, for example, each rack channel 10 is connected to adjacent rack channels 10 by multiple clamps 36 and multiple panels 26 and, therefore, all of the panels 26 and all of the rack channels 10 are electrically grounded together.

Ordinarily, a rack channel 10 will have a length of more than 40 feet thereby eliminating the need for joined segments pre-manufactured and shipped by highway transit. The lack of end-to-end joints or splices, ordinarily found in the prior art, can permit less ballast to be used since there is no joint which can be a site for buckling or hinging due to uplifting wind loads. Tests have revealed a "share loading" phenomena where portions of a rack channel 2½ times the length of a 6-foot panel to either side of the point of interest (for a total length 5 times the length of the single panel) are effective in "share loading" such point against wind uplift. As mentioned, the continuous nature of the rack channels 10 reduces the ability of wind forces developing to lift an array.

Referring now to FIG. 8, a rack channel 120 of a modified, alternative continuous cross-section is shown. The rack channel 120 is preferably roll formed from coiled flat stock on site as described with the channel 10 and is of a length suited for the site. The channel 120 can be formed of 22, 24 or 26 gauge galvanized steel depending, for example, on the climate of the site and the expectation of snow loads on the panels 26. The channel can be used in the same manner as that described for the channel 10.

The channel 120 includes a base wall 121, and two integral upstanding legs 122, 123. A tall leg 122 has an in-turned flange 124 at an upper edge, a minor inwardly extending rib 126 preferably adjacent the flange and a major inwardly extending rib 127 towards the base wall 121. A short leg 123 at its upper edge has an in-turned right-angle flange 1238, with a horizontal portion 129 and a vertical portion 130. At mid-height, the short leg 123 has an in-turned rub 134. The legs 122, 124 preferably are parallel and off plumb by, for example 15°, so that they are generally perpendicular to the plane of the solar panels 26 they support. Preferably, a face 135 of the major rib 127 is vertical and perpendicular to the base wall 121. The base wall 121 has a plurality of inwardly extending ribs 138 spaced apart and with coplanar faces. The ribs 126, 127, 134, 138 serve to stiffen their respective walls and the ribs 138 allow for water drainage.

Transitions or "corners" 136, 137 between the legs 122, 123 and base wall 121 are large in radius or effective radius to reduce stress. Where the channel 120 has a nominal width of 11¼ inch the effective radius at the short leg 123 can be 1 inch and at the tall leg 122 can be ¾ inch. These radii can be approximated by several, for example, 3 to 5, shallow bends to facilitate the roll forming process. Where the channel 120 is, for example, formed of 0.0336 inch (22 gauge) galvanized steel these effective radii are, for example, about 30 times the wall thickness. The base wall 121 and/or lower portions of the corners 136, 137 can be perforated for water drainage.

FIG. 10 illustrates a basic or plain style clamp 140 used to secure a panel 26 to a rack channel 120 by clamping a longitudinal edge of the panel to a flange 124 or 128 of the channel. The clamp 140 is made from two lengths of extruded aluminum, for instance 6061 T6 having an S or Z shape. In FIG. 10, the lower half of the clamp is internally threaded to receive a threaded bolt 141 used to develop a suitable clamping force. The upper half of the clamp has a clearance hole for the shank of the bolt 141. Use of the clamp 140 is shown in FIG. 9 on both legs of a channel 120 and in FIG. 11 on the short legs of a channel.

Figure 12:
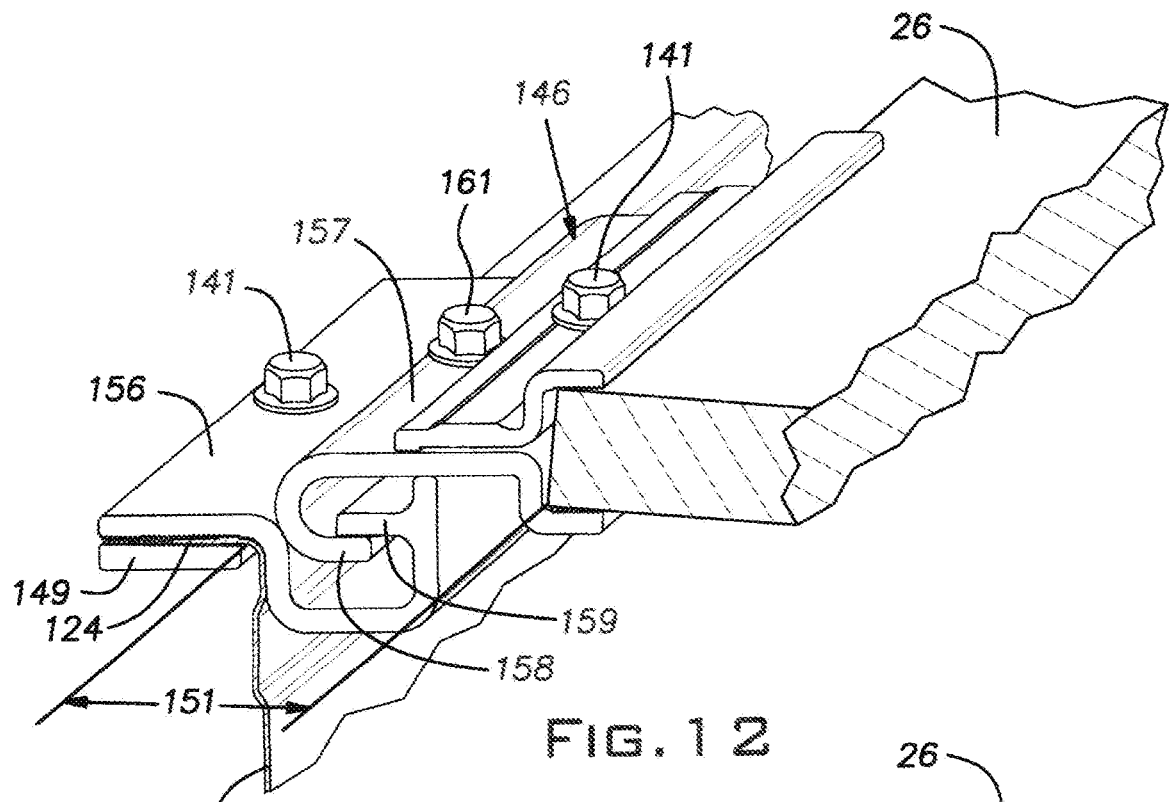
FIG. 12 is an enlarged perspective view of a gap forming, hinge style clamp securing a solar panel to a tall leg of a rack channel.
Figure 13:
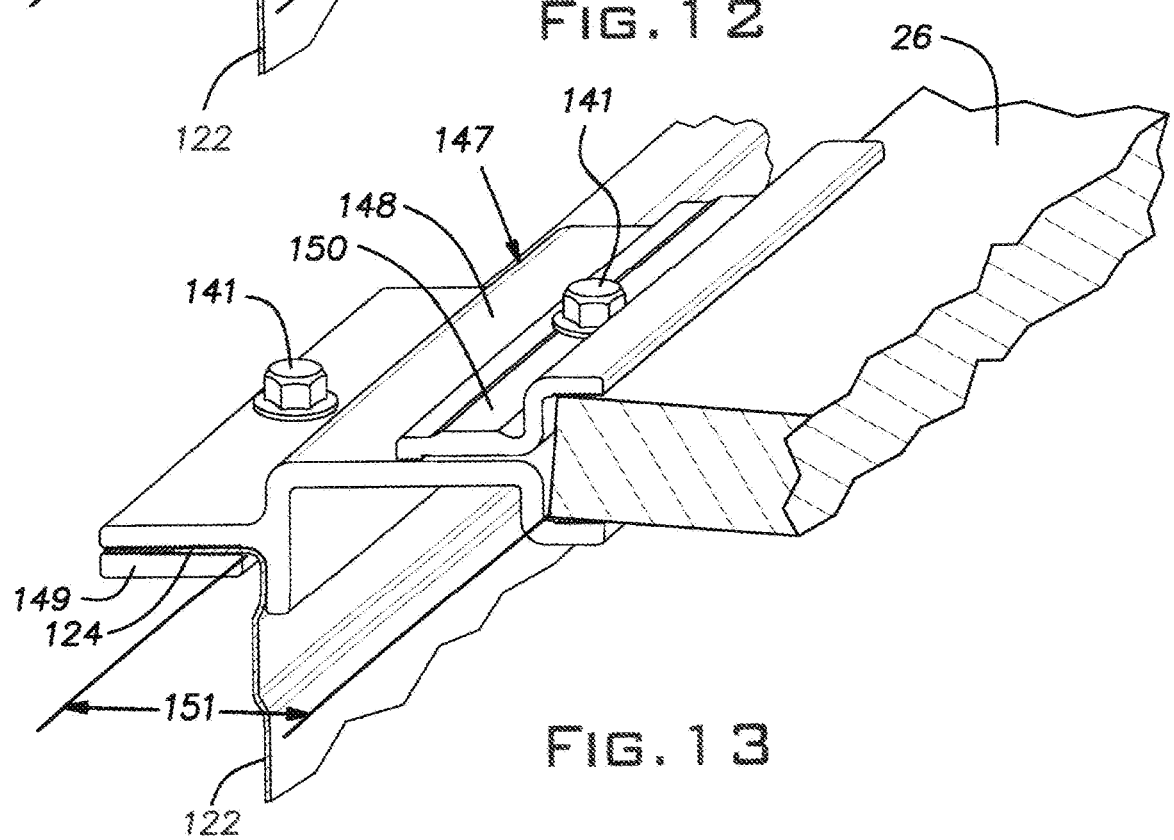
FIG. 13 is an enlarged perspective view of a gap forming plain style clamp joining a solar panel to a rack channel.

FIGS. 12 and 13 illustrate two different styles of clamps 146, 147 that create a horizontal separation or gap 151 between a channel leg 122 and longitudinal edge of a panel 26. Referring to FIG. 13, the clamp 147 has three parts, a main body 148 and grips 149, 150. The grip 149 is a flat length of an extrusion, having a length preferably the same as the body 148. At mid-length, the grip 149 has a tapped hole for receiving a threaded bolt 141 passing through a clearance hole in the body 148. The grip 149 pinches the flange 124 of a channel leg 122. The grip 150 is a length of an S or Z shaped extrusion; a clearance hole in one leg of the grip 150 receives a threaded bolt 141 threaded into a tapped hole in the body 148. Upon tightening, the bolt 141 pinches a longitudinal edge of a solar panel 26 against the clamp body 148.

Study of FIG. 13 reveals the clamp body 148 fixes the longitudinal edge of a panel on the flange 124 of the channel leg 122 while providing a gap 151 of for instance 3 inches, between the leg 122 and edge of the panel 126. This gap or open space 151 keeping in mind that the clamps 147 are longitudinally spaced from one another has been found to reduce the tendency of wind to lift a panel by allowing air pressure to approach equalization above and below a panel. This function of the gap 151, in turn, allows for a large reduction in requisite ballast weight, up to, for example, a 50-90% reduction. Where the channels 120 are installed on the ground, the gap 151 can eliminate the need for ballast.

Referring to FIG. 12, the clamp 146, in addition to providing the gap 151 discussed above in connection with the clamp 147, functions as a hinge to allow a panel 26 to pivot at its longitudinal edge about a horizontal axis adjacent the upper margin of the tall leg 122 of the channel. The clamp 146 comprises a fixed part 156 clamped with a grip 149 to the channel flange 124 and a pivotal part 157 clamped with a grip 150 to the longitudinal edge of a panel 26. The hinge parts 156 and 157 are coupled by inter-engaged integral channel sections 158 and 159. In the normal, near horizontal position of a panel, the hinging clamp parts are locked relative to each other by a threaded bolt 161 threaded into the pivotal part and abutting the channel section 159 of the fixed part 156. The hinged clamps 146 are spaced along one longitudinal edge of a panel and the plain clamps 140 are spaced along the opposite longitudinal edge. When a panel 26 needs to be displaced for maintenance under the panel, for example, the plain clamps 146 along an edge of a panel opposite the hinge clamps 146 are released, the hinge clamp bolts 161 are removed or fully retracted into the pivotal part 157, and the opposite edge is lifted to pivot about the hinge clamps 146. In this way, the lifted panel 26 remains perfectly aligned with its associated channels 120 when it is lowered back into the installed position.

FIGS. 9 and 11 illustrate that the major rib 127 on the tall leg 122 prevents a rectangular ballast block from contacting the adjacent channel corner 136 while the right-angle flange 128 of the short leg 123 on the opposite side of the channel prevents a rectangular ballast block from contacting the adjacent channel corner 137 when the ballast blocks are located between spaced clamps 140.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A method of installing on a horizontal or near-horizontal support surface a solar panel array including multiple solar panels, the method comprising:
    at a deployment site, operating a coil roll-forming machine to fabricate from metal coil stock longitudinally continuous rack channels each having a length of over 40 feet and upstanding legs of different heights;
    locating the channels in parallel rows with a spacing determined by a width of the solar panels with interior spaces of the channels facing upwardly;
    weighing the channels down on the support surface by placing ballast in the interior spaces; and
    positioning the solar panels each with an edge supported by a high leg of one channel of the channels and an opposite edge supported by a low leg of an adjacent channel of the channels,
    the deployment site corresponding to (a) an area within which the support surface resides plus (b) an adjacent area corresponding to (i) a length of the coil roll-forming machine plus the length of the rack channel times (ii) a width of the coil roll-forming machine,
    wherein the positioning the solar panels includes:
    clamping a first longitudinal edge of a solar panel from the solar panels to the high leg of the respective one channel using clamps, wherein the clamps space the first longitudinal edge of the solar panel from the high leg to form a gap therebetween such that there is no vertical overlap between the solar panel and the respective one channel to which the solar panel is clamped.

2. The method of claim 1, wherein the positioning the solar panels includes:
    hingedly clamping a first longitudinal edge of a solar panel from the solar panels to the high leg of the respective one channel using hinged clamps, wherein the clamps space the first longitudinal edge of the solar panel from the high leg to form a gap therebetween and to permit a second longitudinal edge of the solar panel opposite the first longitudinal edge to be pivotably raised about the hinged clamps.

3. The method of claim 1, comprising:
    securing grounding circuitry for the solar panels to the channels.

4. The method of claim 1, comprising:
    keeping each of the rack channels within the deployment site from fabrication of the rack channel to operation of the solar panel array to produce electricity.

5. A method of installing on a horizontal or near-horizontal support surface a solar panel array including multiple solar panels, the method comprising:
    converting metal coil stock to rack channels made of a single piece of sheet metal each having upstanding legs of different heights;
    locating the channels in parallel rows with a spacing determined by a width of the solar panels with interior spaces of the channels facing upwardly;
    weighing the channels down on the support surface by placing ballast in the interior spaces; and
    securing the solar panels to the channels each with an edge supported by a high leg of one channel of the channels and an opposite edge supported by a low leg of an adjacent channel of the channels,
    wherein the securing the solar panels includes:
    hingedly clamping a first longitudinal edge of a solar panel from the solar panels to the high leg of the respective one channel using hinged clamps, wherein the clamps space the first longitudinal edge of the solar panel from the high leg to form a gap therebetween and to permit a second longitudinal edge of the solar panel opposite the first longitudinal edge to be pivotably raised about the hinged clamps.

6. The method of claim 5, wherein the securing the solar panels includes:
    clamping a first longitudinal edge of a solar panel from the solar panels to the high leg of the respective one channel using clamps, wherein the clamps space the first longitudinal edge of the solar panel from the high leg to form a gap therebetween such that there is no vertical overlap between the solar panel and the respective one channel to which the solar panel is clamped.

7. The method of claim 5, comprising:
    securing grounding circuitry for each of the solar panels to respective portions of the channels to which the solar panels are secured.

8. The method of claim 5, comprising:
keeping each of the rack channels within a deployment site within which the support surface is located from the converting to operation of the solar panel array to produce electricity.

9. A solar panel array deployed on a deployment site, comprising:
multiple solar panels;
longitudinally continuous rack channels each having upstanding legs of different heights, the channels located on a support surface in parallel rows with a spacing determined by a width of the solar panels with interior spaces of the channels facing upwardly; and
ballasts disposed in the interior spaces to weigh the channels down on the support surface,
the solar panels each mounted with an edge supported by a high leg of one channel of the channels and an opposite edge supported by a low leg of an adjacent channel of the channels,
the solar panel array further comprising:
clamps clamping a first longitudinal edge of a solar panel from the solar panels to the high leg of the respective one channel using clamps, wherein the clamps space the first longitudinal edge of the solar panel from the high leg to form a gap therebetween such that there is no vertical overlap between the solar panel and the respective one channel to which the solar panel is clamped.

10. The solar panel array of claim 9, comprising:
hinged clamps hingedly clamping a first longitudinal edge of a solar panel from the solar panels to the high leg of the respective one channel using hinged clamps, wherein the clamps space the first longitudinal edge of the solar panel from the high leg to form a gap therebetween and to permit a second longitudinal edge of the solar panel opposite the first longitudinal edge to be pivotably raised about the hinged clamps.

11. The solar panel array of claim 9, comprising:
ground connections for securing grounding circuitry for the solar panels to the channels.

12. The solar panel array of claim 9, comprising:
solar panels ground connections for securing grounding circuitry for solar panels mounted to a channel, the channel having a single ground connection to earth or a remote power system.

13. A solar panel array deployed on a deployment site, comprising:
multiple solar panels;
longitudinally continuous rack channels each having a length of over 40 feet and upstanding legs of different heights, the channels located on a support surface in parallel rows with a spacing determined by a width of the solar panels with interior spaces of the channels facing upwardly; and
ballasts disposed in the interior spaces to weigh the channels down on the support surface,
the solar panels each positioned with an edge supported by a high leg of one channel of the channels and an opposite edge supported by a low leg of an adjacent channel of the channels,
the deployment site corresponding to (a) an area within which the support surface resides plus (b) an adjacent area corresponding to (i) a length of a coil roll-forming machine plus the length of the rack channel times (ii) a width of the coil roll-forming machine,
the solar panel array further comprising:
hinged clamps hingedly clamping a first longitudinal edge of a solar panel from the solar panels to the high leg of the respective one channel using hinged clamps, wherein the clamps space the first longitudinal edge of the solar panel from the high leg to form a gap therebetween and to permit a second longitudinal edge of the solar panel opposite the first longitudinal edge to be pivotably raised about the hinged clamps.

14. The solar panel array of claim 13, comprising:
clamps clamping a first longitudinal edge of a solar panel from the solar panels to the high leg of the respective one channel using clamps, wherein the clamps space the first longitudinal edge of the solar panel from the high leg to form a gap therebetween such that there is no vertical overlap between the solar panel and the respective one channel to which the solar panel is clamped.

15. The solar panel array of claim 13, comprising:
ground connections for securing grounding circuitry for the solar panels to the channels.

16. The solar panel array of claim 14, comprising:
solar panels ground connections for securing grounding circuitry for solar panel mounted to a channel, the channel having a single ground connection to earth or a remote power system.

\* \* \* \* \*